United States Patent [19]

Parker et al.

[11] 4,185,457
[45] Jan. 29, 1980

[54] TURBOFAN-RAMJET ENGINE

[75] Inventors: Sidney D. Parker, Lake Park; Robert G. Carroll, West Palm Beach; William L. Howell, North Palm Beach, all of Fla.

[73] Assignee: United Technologies Corporation, Hartford, Conn.

[21] Appl. No.: 653,187

[22] Filed: Jan. 28, 1976

[51] Int. Cl.² ............................ F02K 3/06; F02C 7/02
[52] U.S. Cl. ........................................ 60/204; 60/225; 60/244; 60/263; 60/270 R
[58] Field of Search ............... 60/224, 225, 226 R, 60/244, 245, 263, 270 R, 204

[56] References Cited

U.S. PATENT DOCUMENTS

| 2,909,894 | 10/1959 | O'Donnell | 60/244 |
| 2,934,895 | 5/1960 | Gregory et al. | 60/244 |
| 3,280,564 | 10/1966 | Keenan et al. | 60/244 |
| 3,296,800 | 1/1967 | Keenan et al. | 60/244 |
| 3,449,914 | 6/1969 | Brown | 60/226 R |
| 3,477,230 | 11/1969 | Bauger et al. | 60/224 |
| 3,879,941 | 4/1975 | Sargisson | 60/226 R |

FOREIGN PATENT DOCUMENTS 1182504  2/1970  United Kingdom ............... 60/244

Primary Examiner—Robert E. Garrett
Attorney, Agent, or Firm—Jack N. McCarthy

[57] ABSTRACT

A turbofan-ramjet engine is provided with optional duct burning in the turbofan mode. A core engine is provided with a first annular passage therearound for directing airflow around the inlet of the core engine. A second annular passage having a fan directs air flow into the inlet of the core engine and said first annular passage. A third annular passage extends around the first and second annular passage with the first and third annular passage each directing their flow into a common annular combustion chamber. Variable vanes are provided in the first and third annular passages to provide for blocking off the passage or acting as swirl vanes depending on mode of operation. Blocking vanes are also provided in the annular exhaust passage of the core engine. Coannular nozzles are provided with one located at the exhaust of the core engine and an outer one located aft of the common annular combustion chamber. Air bleed means are provided for providing a positive pressure behind vanes in the first or third annular passage when either one is placed in its flow-blocking position to prevent undesired propagation of flame into that passage.

7 Claims, 1 Drawing Figure

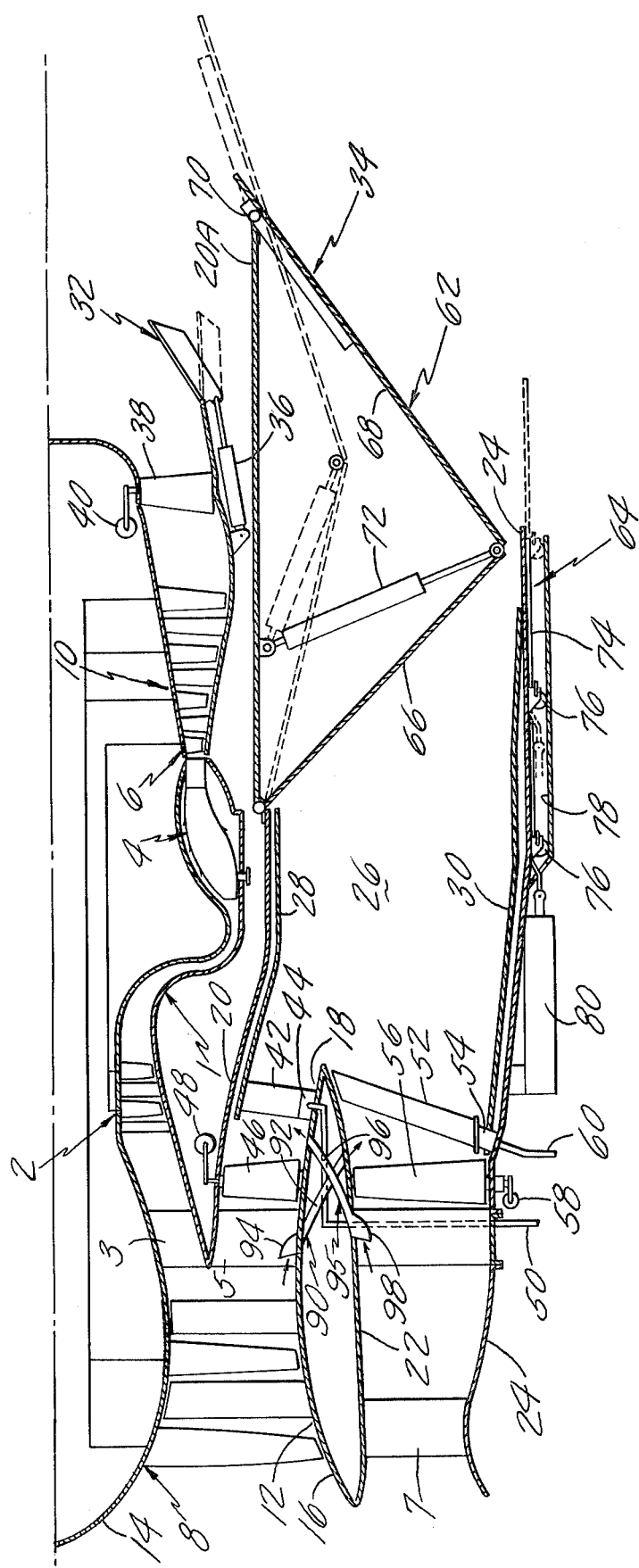

TURBOFAN-RAMJET ENGINE

BACKGROUND OF THE INVENTION

This invention relates to compound engines and in particular to a turbofan-ramjet engine providing for optional duct burning in the turbofan mode. A turbonfan-ramjet engine is disclosed in U.S. Pat. No. 2,952,973 and other composite power plants including turbojet and ramjet combinations are set forth in the following U.S. Patents: U.S. Pat. No. 2,896,408; U.S. Pat. No. 3,091,082 and U.S. Pat. No. 3,280,564.

SUMMARY OF INVENTION

A primary object of this invention is to provide a turbofan-ramjet engine with optional duct burning in the turbofan mode.

In accordance with the present invention, a first annular passage directs airflow around the annular inlet of a core engine, a second annular passage having a fan directs airflow into the annular inlet of the core engine and said first annular passage; a third annular passage directs airflow around the first and second annular passages, both first and third annular passages direct their flow into a common annular combustion chamber.

In accordance with a further aspect of the invention, variable vanes are placed in a first annular passage around the core engine and in a second annular passage around said first annular passage, and act as blocking vanes or swirl vanes depending on mode of operation of the turbofan-ramjet engine.

In accordance with a further aspect of the invention, a first air bleed passage connects the area forward of first vanes in a first annular passage leading to a combustion chamber to the area rearwardly of second vanes in a second annular passage leading to the same combustion chamber and second air bleed passages connect the area forward of said second vanes in said second annular passage to the area rearwardly of said first vanes in said first annular passage. This arrangement provides a positive pressure behind closed vanes to prevent undesired propagation of flame upstream.

It is a further object of this invention to provide coannular nozzles for the turbofan mode, with or without duct burning.

It is another object of the invention to provide an annular burner system that is a fan duct burner when the turbofan is operating at low Mach numbers and a ram burner at high Mach numnbers.

BRIEF DESCRIPTION OF THE DRAWING

The FIGURE is a schematic view taken through the turbofan-ramjet engine showing the lower half thereof.

DESCRIPTION OF THE PREFERRED EMBODIMENT

Referring to the FIGURE, a conventional core engine 1 is shown with a high pressure compressor section 2, combustion section 4 and high pressure turbine section 6. A fan section 8 is mounted for rotation forwardly thereof and is connected to a low pressure turbine 10 located rearwardly of the turbine section 6. Coaxial driving shafts of a conventional type are provided.

The movable fan section 8 contains blades which extend into an annular passage 12 which is formed between the forwardly projecting nose section 14 which extends forwardly of the core engine and the inner surface of a shroud 16 which extends around the nose section 14 and the forward part of the core engine 1. The inner surface of the shroud 16 forms a second annular passage 18 with a casing 20 placed around the core engine. Fixed radial struts 3 extend between the fixed inner surface of the inlet to the core engine 1 and the outer surface of the inlet to the core engine 1 and fixed radial struts 5 extend between the forward end of the casing 20 and an intermediate point on the inner surface of the shrouds 16, which is at the forward part of the second annular passage 18. This provides an arrangement where the fan directs air into the inlet of the core engine and into the annular passage 18.

A third annular passage 22 is formed between the outer surface of the shroud 16 and an outer casing 24 which is placed around the nose section 14 and core engine 1. This third annular passageway provides for the entrance of ram air. Fixed struts 7 extend between the outer surface of the shroud 16 and the outer casing 24 at the forward part of the third annular passage 22. The rearward ends of the annular passage 18 and annular passage 22 enter into a common combustion chamber 26 formed between two inner and outer liners 28 and 30, respectively.

Coannular nozzle systems 32 and 34 are provided rearwardly of the low pressure turbine section 10 and combustion chamber 26, respectively. The nozzle system 32 of the core engine is moved by actuators 36 which are controlled by conventional jet engine controls as is the remainder of the core engine including conventional fuel controls. Blocking vanes 38 are located in the annular exhaust passage extending rearwardly of the turbine section 10; an actuating system 40 moves these vanes between an open and shut position for a purpose to be hereinafter described. Radial spray bars 42 extend inwardly from the rear inner surface or shroud 16 into the second annular passage 18 for providing fuel for mixing with air passing through said annular passage 18. A pilot igniting means 44 is provided at the base thereof for ignition of the fuel-air mixture, leaving the annular passage 18 and entering the combustion chamber 26. Fuel is delivered to the radial spray bars 42 and pilot igniting means 44 through conduit means 50. The fuel control means here can be of the conventional duct burning type in the same manner as patents referred to above.

Vanes 46 are positioned in said annular passage 18 forwardly of the radial spray bars 42 for pivotal movement about their longitudinal axes to provide their positioning to completely block the flow through passage 18 or to control their angular position so that they will provide a swirling flow to the air entering the passage 18, thereby forming a vortex flow over the spray bars 42 and then into the annular combustion chamber 26. Actuators 48 are positioned between the casing 20 and core engine 1 for controlling the vanes 46.

Radial spray bars 52 extend inwardly from outer casing 24 into the third annular passage 22 for providing fuel for mixing with air passing through said annular passage 22. A pilot igniting means 54 is provided at the base thereof for ignition of the fuel air mixture, leaving the annular passage 22 and entering the combustion chamber 26. Fuel is delivered to the radial spray bars 52 and pilot igniting means 54 through conduit means 60. The fuel control means here can be of the conventional ram burning type in the same manner as patents referred to above.

Vanes 56 are positioned in said annular passage 22 forwardly of the radial spray bars 52 for pivotal movement about their longitudinal axes to provide their positioning to completely block the flow through passage 22 or to control their angular position so that they will provide a swirling flow to the ram air entering the passage 22, thereby forming a vortex flow over the spray bars 52 and then into the annular combustion chamber 26. Actuators 58 are positioned externally of the outer casing 24 for controlling the vanes 56.

Air bleed means 90 connects the area forward of vanes 46 in annular passage 18 to the area rearwardly of vanes 56 in annular passage 22. The air bleed means 90 comprises a plurality of tubes 92 extending through the shroud 16 and equally spaced therearound. Scoops 94 project inwardly from the forward end of each of the tubes 92 and each tube outlet exhausts at the outer surface of the shroud 16. Air bleed means 95 connects the area forward of vanes 56 in annular passage 22 to the area rearwardly of vanes 46 in annular passage 18. The air bleed means 95 comprises a plurality of tubes 96 extending through the shroud 16 and equally spaced therearound. Scoops 98 project outwardly from the forward end of each of the tubes 96 and each tube equally exhausts at the inner surface of the shroud 16. The air bleed means 90 and 95 provide a positive pressure behind the vanes 46 and 56 when either of them is in its closed position to keep flame from combustion chamber 26 from propagating upstream into the annular passage blocked off.

The nozzle system 34 provided at the exit of the combustion chamber 26 is comprised of two main parts: an inner movable part 62 and an outer movable part 64. The inner movable part 62 provides a plurality of converging flaps 66 pivotally mounted to the rearward end of casing 20 with a plurality of diverging flaps 68 being pivotally mounted to the rearward ends of converging flaps 66 at their forward end and guided at their rearward end by a guiding mechanism 70 fixed to an extension 20A. This permits the inner movable part 62 to move between its outermost position, shown in solid lines, to its inner position, shown by dotted lines, the positioning of said inner movable part or being governed by the operating mode of the turbofan-ramjet engine. The outer movable part 64 of the nozzle system 34 comprises an annular shroud 74 which is moved between its retracted position, shown by solid lines, and its axially extended position, shown in dotted lines. Here again, the position of the annualr shroud 74 is governed by the operating mode of the turbofan-ramjet engine. Actuating means 72 are provided to position the inner part 62 of the nozzle system 34. The shroud 74 has rollers 76 mounted thereon which are guided in a track means 78, said shroud being moved on its rollers by an actuating means 80, the actuating means 72 and 80 being conventional actuators which are positioned in accordance with the operating mode desired.

The three basic modes of this turbofan-ramjet engine are the following: (1) The turbofan mode, with no duct burning, wherein the vanes 38 are in their open position, vanes 46 are in their wide open position, vanes 56 are closed, and nozzle system 34 is positioned in the position shown in solid lines in the Figure. The nozzle system 32 is controlled along with the other controls to provide the desired thrust; (2) The turbofan mode, with duct burning, wherein vanes 38 are still open, vanes 46 are changed to obtain a desired angle of swirl to obtain the desired burning in combustion chamber 26, vanes 56 remain closed and nozzle system 34 is actuated to obtain the desired nozzle opening; and (3) The ramjet mode, wherein the core engine 1 is shut down with vanes 38 placed in their closed position along with vanes 46 and vanes 56 are placed to obtain the desired angle of swirl to obtain the desired burning in combustion chamber 26, and nozzle system 34 is actuated to obtain the desired nozzle opening. This includes the axial movement of shroud 74 to maintain said shroud radially outward of the connecting point of the converging and diverging flaps which represents the throat.

We claim:

1. A turbofan-ramjet engine having a core engine with a compressor section, burner section and turbine section, a first annular passage located around said core engine for directing airflow around the inlet of said core engine, a second annular passage located forwardly of the inlet of the core engine and said first annular passage for directing airflow thereinto, a fan positioned in said second annular passage, a third annular passage extending around said first and second annular passage, a common annular combustion chamber receiving the flow from said first and third annular passages, said core engine having a first nozzle means controlling the exhaust therefrom, said common annular combustion chamber having an annular nozzle means located around said first nozzle means for controlling the exhaust flow from said common annular combustion chamber, first movable vanes being positioned in said first passage, said first movable vanes being movable between a position where they block off flow through said first passage to a position where they act as swirl vanes for providing a desired angle of swirl flow into said common annular combustion chamber, means for placing said first movable vanes at a desired angle to obtain a desired swirl flow, second movable vanes being positioned in said third passage, said second movable vanes being movable between a position where they block off flow through said third passage to a position where they act as swirl vanes for providing a desired angle of swirl flow into said common annular combustion chamber, means for placing said second movable vanes at a desired angle to obtain a desired swirl flow.

2. A turbofan-ramjet engine as set forth in claim 1 wherein air bleed means connects the area forward of the first movable vanes to the area rearwardly of the second movable vanes to minimize recirculation from the common combustion chamber.

3. A turbofan-ramjet engine as set forth in claim 1 wherein air bleed means connects the area forward of the second movable vanes to the area rearwardly of the first movable vanes to minimize recirculation from the common combustion chamber.

4. A turbofan-ramjet engine as set forth in claim 2 wherein air bleed means connects the area forward of the second movable vanes to the area rearwardly of the first movable vanes to minimize recirculation from the common combustion chamber.

5. A method of operating a turbofan-ramjet engine having a core engine and an annular fan duct and ram duct located therearound having a common annular combustion chamber, said core engine and said common combustion chamber each having means for controlling the flow therefrom, the steps of:
(1) operating the engine for turbofan operation with no duct burning by
(a) blocking the flow through said ram duct;
(b) flowing air through said fan duct; and (c) controlling the flow from said common annular combustion chamber;

(2) operating the engine for turbofan operation with duct burning by
 (a) providing burning within said common annular combustion chamber while swirling the air flowing through the fan duct at a desired angle of swirl;

(3) operating the engine for ramjet operation by
 (a) blocking the flow through said core engine;
 (b) blocking the flow through said fan duct; and
 (c) providing burning within said common annular combustion chamber while swirling the air flowing through the ram duct at a desired angle of swirl.

6. A method of operating a turbofan-ramjet engine as set forth in claim 5 including step (1)(d) air is directed just downstream of where the flow through said ram duct is blocked to provide a positive pressure.

7. A method of operating a turbofan-ramjet engine as set forth in claim 5 including step (3)(d) air is directed just downstream of where the flow through said fan duct is blocked to provide a positive pressure.

* * * * *